United States Patent
Lospinuso et al.

(10) Patent No.: US 10,291,647 B2
(45) Date of Patent: May 14, 2019

(54) APPARATUS AND METHOD FOR ENABLING SAFE HANDLING OF MALWARE

(71) Applicant: The Johns Hopkins University, Baltimore, MD (US)

(72) Inventors: Margaret F. Lospinuso, Durham, NC (US); Laura J. Glendenning, Columbia, MD (US)

(73) Assignee: The Johns Hopkins University, Baltimore, MD (US)

(*) Notice: Subject to any disclaimer, the term of this patent is extended or adjusted under 35 U.S.C. 154(b) by 312 days.

(21) Appl. No.: 15/134,846

(22) Filed: Apr. 21, 2016

(65) Prior Publication Data

US 2016/0315950 A1  Oct. 27, 2016

Related U.S. Application Data

(60) Provisional application No. 62/153,116, filed on Apr. 27, 2015.

(51) Int. Cl.
*H04L 9/32* (2006.01)
*H04L 29/06* (2006.01)

(52) U.S. Cl.
CPC ........ *H04L 63/145* (2013.01); *H04L 63/0428* (2013.01)

(58) Field of Classification Search
CPC ... G06F 21/568; G06F 21/56; H04L 63/1441; H04L 63/145; H04L 63/0428
See application file for complete search history.

(56) References Cited

U.S. PATENT DOCUMENTS

| | | | |
|---|---|---|---|
| 6,718,469 B2 | 4/2004 | Pak et al. | |
| 7,636,856 B2 | 12/2009 | Gheorghescu et al. | |
| 7,640,361 B1 | 12/2009 | Green et al. | |
| 8,528,089 B2 | 9/2013 | Gryaznov | |
| 9,317,679 B1* | 4/2016 | Bhatkar | G06F 21/50 |
| 2003/0088705 A1* | 5/2003 | Katagishi | G06F 21/56 709/246 |
| 2004/0139334 A1* | 7/2004 | Wiseman | G06F 21/51 713/188 |
| 2008/0310623 A1* | 12/2008 | Phillips, II | H04L 63/045 380/29 |
| 2011/0113283 A1* | 5/2011 | Morris | G06F 11/1438 714/15 |
| 2013/0091571 A1 | 4/2013 | Lu | |
| 2014/0068768 A1 | 3/2014 | Lospinuso et al. | |
| 2014/0150101 A1 | 5/2014 | Chiu et al. | |
| 2014/0259159 A1* | 9/2014 | Banga | G06F 21/56 726/22 |
| 2014/0289857 A1 | 9/2014 | Stewart et al. | |

* cited by examiner

*Primary Examiner* — Trong H Nguyen
(74) *Attorney, Agent, or Firm* — Todd R. Farnsworth

(57) ABSTRACT

An apparatus for rendering malware files safe for handling may include processing circuitry configured to receive a executable object, divide the executable object into a plurality of segments, remove execution capability from each of the segments, encrypt each of the segments to generate an encrypted segment set, and reassemble the encrypted segment set as a dismembered executable object.

21 Claims, 3 Drawing Sheets

APPARATUS AND METHOD FOR ENABLING SAFE HANDLING OF MALWARE

CROSS-REFERENCE TO RELATED APPLICATIONS

This application claims the benefit of U.S. Provisional Application No. 62/153,116 filed on Apr. 27, 2015, the entire contents of which are hereby incorporated herein by reference.

TECHNICAL FIELD

Example embodiments generally relate to malware handling and analysis and, in particular, relate to a mechanism by which to make handling of malware safe during such analysis.

BACKGROUND

With the advent of computers and communication networks, the ability to generate, store, utilize, distribute, publish or otherwise share content and information has vastly improved. This has further led to the routine transfer of large amounts of data, content and information between devices. While much of the material transferred between devices is exactly that which is desired by the corresponding users, malicious software (or malware) can also be transferred among devices. The malware may pose privacy or security concerns, or it may be disruptive or even destructive and costly in some situations.

In order to attempt to minimize the impact of malware, anti-virus software, network operations centers, network security offices and other entities may operate to attempt to accurately and quickly determine whether a received piece of unknown software includes binary code that is or contains malware. Protection against malware often requires not only the identification of a particular piece of malware, but the analysis of malware to ensure that variants thereof can also be spotted in the future to enhance protective capabilities. Forensic analysis of binary codes can often be a lengthy, time-consuming operation that requires highly trained specialists. The specialists and the tools they use may need to have access to the malware, which may cause the risk of execution of malware to be incurred.

Malware executable objects (e.g., computer viruses and worms) are dangerous in networked environments due to the risk that they will inadvertently execute and compromise network nodes. This makes it both difficult and costly to support forensic investigation and to develop a comprehensive malware processing and analysis flow in a networked environment, as the nodes that receive malware must be quarantined from the network while analysts typically do most of their work on a separate network. Lack of fast, straightforward networked access to malware files for analysis, both by human analysts and by software analytics, imposes extra costs in time and in duplication of special computer hardware and access areas. Quarantine areas are expensive to build, maintain and operate.

Accordingly, it may be desirable to continue to develop improved and/or more efficient mechanisms by which protection against malware may be provided. Moreover, in some cases, it may be desirable to allow safe handling of malware in a networked environment so that the costs in time, complexity and equipment for special handling of malware can be avoided or at least substantially reduced.

BRIEF SUMMARY OF SOME EXAMPLES

Accordingly, some example embodiments may enable the provision of a solution for addressing the issues described above. In this regard, for example, some embodiments may enable the safe handling of malware. Moreover, the employment of example embodiments may allow automatic procedures to be implemented anytime suspected malware is transferred or moved within a system or network to ensure that the suspected malware cannot detonate unexpectedly.

In one example embodiment, an apparatus for rendering malware files safe for handling may include processing circuitry. The processing circuitry may be configured to receive an executable object, divide the executable object into a plurality of segments, remove execution capability from each of the segments, encrypt each of the segments to generate an encrypted segment set, and reassemble the encrypted segment set as a dismembered executable object.

In another example embodiment, a method for rendering malware files safe for handling is provided. The method may include receiving an executable object, dividing the executable object into a plurality of segments, removing execution capability from each of the segments, encrypting each of the segments to generate an encrypted segment set, and reassembling the encrypted segment set as a dismembered executable object.

In still another example embodiment, a system for rendering malware files safe for handling is provided. The system may include a security agent, a dismemberment engine, a policy engine, and an access interface. The security agent may be configured to identify malware among files of a network and enable files not containing malware to proceed to benign storage, but provide a malware file identified to a malware repository. The dismemberment engine may include processing circuitry. The processing circuitry may be configured to receive an executable object, divide the executable object into a plurality of segments, remove execution capability from each of the segments, encrypt each of the segments to generate an encrypted segment set, and reassemble the encrypted segment set as a dismembered executable object. The policy engine may be configured to instruct the dismemberment engine regarding dividing the malware file. The access interface may be operably coupled to the policy engine to receive a request for the malware file and communicate with the policy engine to ensure that the malware file is converted to the dismembered executable object before the request is fulfilled.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
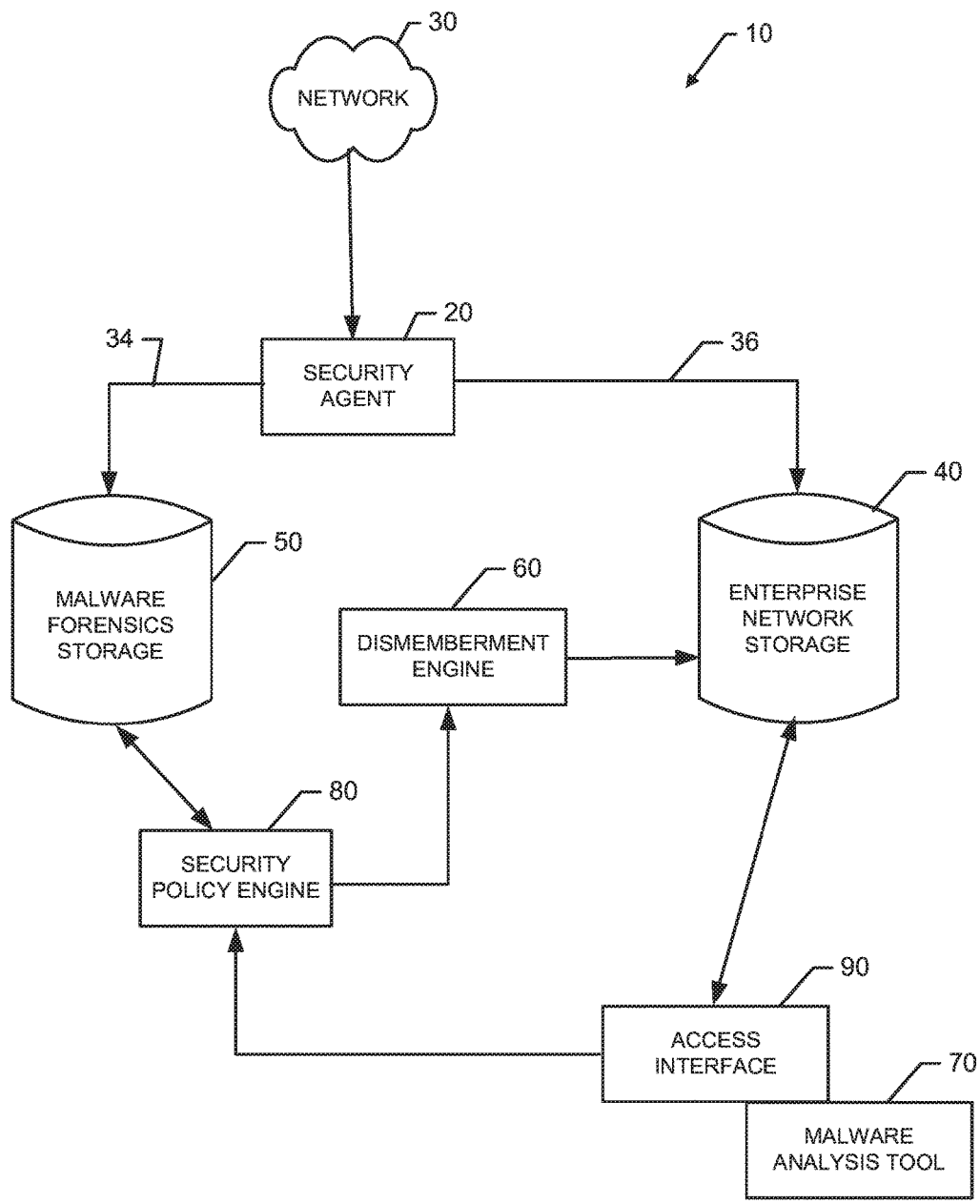
FIG. 1 illustrates a functional block diagram of a system that may be useful in connection with enabling safe handling of malware according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, the term "executable object" should be understood to include anything that has executable content, including, but not limited to, executable binaries, programs in script languages, documents, videos, pictures, and music. As used herein the term "dismembered executable object" should be understood to be a formerly executable object that in its dismembered state is completely unable to execute.

As used in herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

As indicated above, some embodiments of the present invention may relate to the handling of malicious software. In the malware handling context, detection of malware may be based on any suitable method, and then example embodiments may come in to play relative to rendering the malware harmless for inspection or analysis. It may be possible to render malware harmless by compressing it into zip files, or by surrounding the malware with temporary software wrappers. However, these methods have a serious flaw in that when the files are unzipped or unwrapped, the malware is reconstituted in its entirety, fully capable of executing and therefore detonating during analysis. Thus, zipping and wrapping may be useful tools for storage and transmission, but are not useful to render the malware safe also for analysis.

Example embodiments may employ a strategy to "defang" or otherwise render malware safe not only for storage and transport, but also for analysis. Thus, example embodiments may make the malware safe to handle, analyze and store in a normal networked environment without requiring a quarantined network segment. By employing example embodiments, the malware is dismembered into component pieces, removing the execution capability from each part. In some cases, the execution capability may be removed by removing execution capability from the header needed to launch execution and by encrypting the pieces. Reassembly of the pieces may be conducted to generate a list of the pieces relating to the malware that has been dismembered. A header may then be added to document the executable object malware file and optionally include the decryption information needed to access the pieces. The list of pieces and corresponding header may define a "defanged" version, or dismembered version of the executable object.

Some example embodiments may also provide an interface to permit analysis tools to unencrypt pieces for detailed examination of sections of the original executable object. Dismemberment and encryption by example embodiments may make it impossible to assemble and execute the pieces without deliberate effort and skilled reassembly. The original executable object malware file itself may also be retained on an isolation node to remain clean and available for chain-of-evidence forensics or other analysis. Meanwhile, the dismembered version of the executable object may be freely released into analysis environments and databases. This makes the dismembered version of the executable object readily available for analysis by analytic processes and personnel without the expense and delays required by quarantine requirements, or the risk that malware will detonate in a networked environment.

Accordingly, in some embodiments, a capability to dismember malware can be embedded into an analysis environment as a fully automatic capability that provides an interface to existing or new analytical tools. The capability to dismember malware can also be embedded as part of a gateway (e.g., a one way gateway) to forensics storage of untouched original malware binaries. When analysts request one of the malware binaries (e.g., because the requested executable object is identified by searching for related malware), the requested executable object can be dismembered and transmitted to another network as a dismembered version of the requested executable object to another network through the gateway. Reverse engineering and malware analysis tools may then incorporate the dismemberment strategy described herein so that the original executable object sections can be provided for analysis as needed. Such functionality may be fully automatic, and without user intervention. Analysts can then retain local collections of binaries in dismembered form for intensive analysis.

When the dismembering and encryption strategy described herein is embedded into an analytic environment, analysts can store dangerous properties without having to remember to implement complicated procedures. Additionally, concern for proper execution of such procedures can also be reduced, as automatic handling of the dismemberment may be provided. If questions should arise that require access to the original, untouched executable object, such as for forensics, the access can still be provided on an isolation node, while analysis is also enabled by the dismemberment strategy at significantly reduced expense in hardware and time. Thus, for example, worms, viruses and other malware may be detected and dismembered for safe handling. Provision of safe handling as an automatically implemented safeguard may be useful to improve the security and stability of platforms that operate on executable code. Moreover, embodiments may be applicable to personal computer (PC) programs, mobile terminal programs or executable code for use with any execution platform.

An example embodiment of the invention will now be described in reference to FIG. 1, which illustrates an example system in which an example embodiment may be employed. As shown in FIG. 1, a system 10 according to an example embodiment may include one or more network security processing components (e.g., security agent 20) operably coupled to a network 30. Notably, although FIG. 1 illustrates one network 30 and one security agent 20, it should be appreciated that a single instance of each entity or many more instances of each entity may be included in some embodiments and thus, the entities of FIG. 1 are simply used to illustrate a potential for a multiplicity of networks and security agents that could be employed and the number of such entities is in no way limiting to other example embodiments. In this regard, example embodiments are scalable to inclusion of any number of networks and security agents being tied into the system 10.

Although the example of FIG. 1 will be described in reference to an enterprise network, it should be appreciated that the network 30 could be any type of network. The network 30 may therefore, in some cases, be associated with a single organization, department within an organization, individual, or location using private IP address space (i.e., a private network). However, in some embodiments, the network 30 may be associated with different corresponding individuals, locations, departments or organizations. Meanwhile, the security agent 20 may be any suitable malware trap, virus identification tool or other network security processing component with or without a firewall. In any case, the security agent 20 may be configured to identify malware or potential malware and protect enterprise network storage 40 from such malware. As such, for example, any malware executable object 34 identified by the security agent 20 may be directed by the security agent 20 to malware forensics storage 50, which may be a repository for original malware executable object files, and may be sequestered from the enterprise network storage 40. Meanwhile, benign traffic 36 is allowed to pass through the security agent 20 to the enterprise network storage 40 (or benign storage).

The contents of the malware forensics storage 50 may include original and unchanged copies of the original malware executable object files. These files would normally not be allowed to be transferred to the enterprise network storage 40 without significant controls due to the risk of accidental detonation. However, as shown in FIG. 1, example embodiments may employ a dismemberment engine 60 to allow files to be processed to allow safe handling and transmission to the enterprise network storage 40 or other locations. For example, if a malware analysis tool 70 is desired for processing or analysis of malware, the malware can be processed by the dismemberment engine 60 (i.e., "defanged") prior to transmission of the malware to the malware analysis tool 70.

In an example embodiment, the system 10 may include a security policy engine 80 that is configured to receive malware from the malware forensics storage 50 to determine appropriate handling thereof. In this regard, for example, the security policy engine 80 may be configured to determine how to process the malware and provide instructions for the same to the dismemberment engine 60. The security policy engine 80 may be able to determine when a new piece of malware is received in the malware forensics storage 50. In response to determining that the new piece of malware has been received, the malware forensics storage 50 may be configured to reference policies stored therein to a strategy for treatment of the new piece of malware. The strategy for treatment may include a policy to dictate how to divide the new piece of malware into segments (or pieces) and how to encrypt the segments. The security policy engine 80 may then provide instructions to the dismemberment engine 60 regarding the same. In some cases, predefined classes of malware may have corresponding strategies for encryption associated therewith. Thus, for example, malware from different sources may receive different encryption as a way of protecting sources and methods of handling. The security policy engine 80 may also be configured to receive requests for access to malware from an access interface 90. In response to any such requests, the security policy engine 80 may ensure that the dismemberment engine 60 is employed to render such malware safe for handling (e.g., convert the malware into a dismembered executable object) before the malware can be transported out of the malware forensics storage 50.

The access interface 90 may be configured to act as an interface between the malware analysis tool 70 (or any other entity capable of requesting malware from the malware forensics storage 50) to allow processes or individuals to make requests for malware. Each request is transmitted through the security policy engine 80 so that appropriate policies and procedures are employed prior to any malware being transported out of the malware forensics storage 50. As such, any request can only be fulfilled after the dismemberment engine 60 operates according to policy and/or strategy defined by the security policy engine 80.

In an example embodiment, the access interface 90 may be configured to understand the interfaces to each tool that is an example of the malware analysis tool 70. Thus, the access interface 90 may be configured to facilitate retrieval of malware from the enterprise network storage 40 after such malware has been processed by the dismemberment engine 60. Any request for access to malware that has not been processed by the dismemberment engine 60 would automatically trigger (via the security policy engine 80) operation of the dismemberment engine 60 before the request can be fulfilled. The access interface 90 may also include information indicative of how much of an executable object can be decrypted simultaneously (according to policy) by corresponding tools, as a safety measure to ensure that malware cannot be unwittingly reconstituted. The access interface 90 may therefore coordinate with the security policy engine 80 and the dismemberment engine 60 to decrypt authorized portions of segments associated with dismembered executable objects and provide such portions of segments to corresponding tool plugins that do any needed formatting associated with the corresponding tool.

In some cases, the access interface 90 (or another interface) may be further provided to inform the malware analysis tool 70 of the malware that is located in the malware forensics storage 50 for potential analysis. Thus, an operator or analyst can select malware from available options and make a request for the malware. The request would then be processed as described above. In some cases, unpacking and de-archiving tools may also be included in the system 10 as another interface to facilitate network security processing. In order to recognize malware, this interface may be configured to separate file archives into separate files and unpack malware that has been packed. In use, if a user chooses not to install unpacking and de-archiving tools in system 10, systems 80 and 60 would need policies and procedures, respectively, for dismembering incoming files that can contain a number of files, so that a segment of a dismembered file cannot inadvertently contain an entire executable object packed or archived within it.

Figure 2:
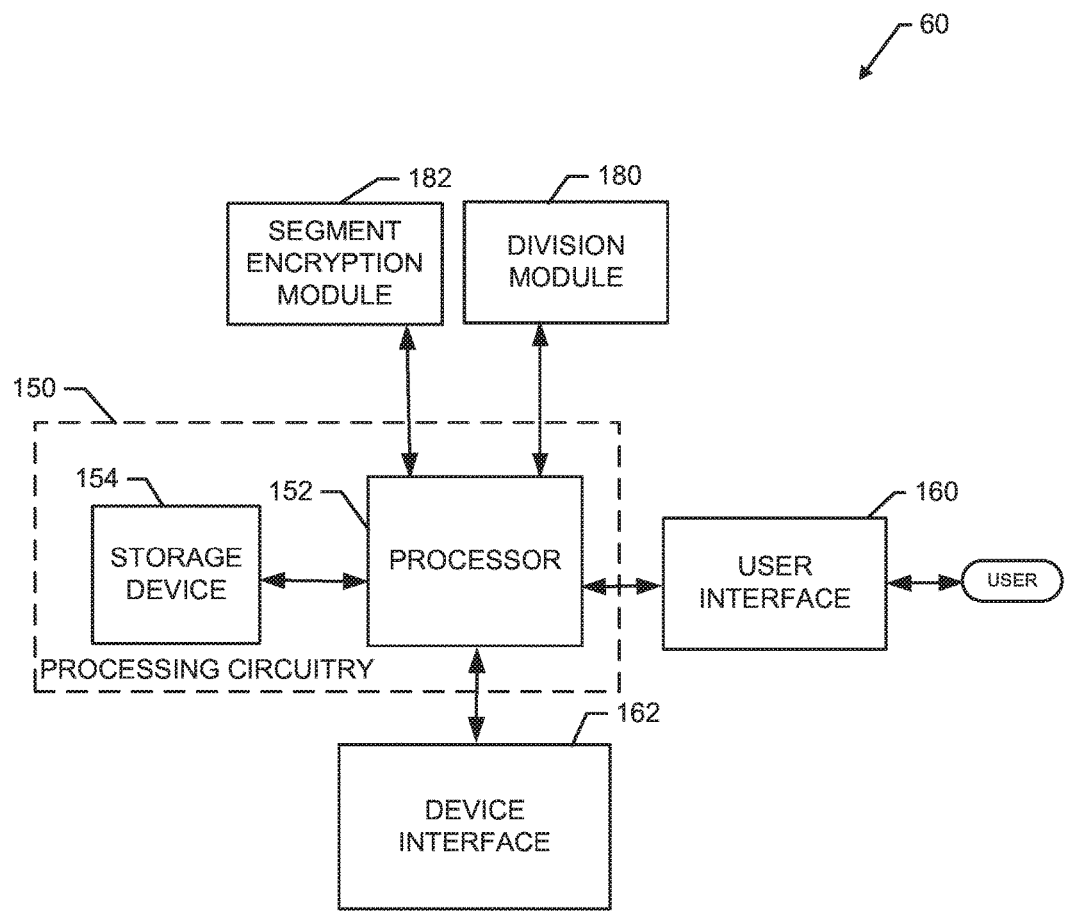
FIG. 2 illustrates a functional block diagram of an apparatus that may be useful in connection with enabling safe handling of malware according to an example embodiment.

An example embodiment of the invention will now be described with reference to FIG. 2. FIG. 2 shows certain elements of an apparatus for provision of enabling safe handling of executable binaries (or other content that can carry malicious code) according to an example embodiment. The apparatus of FIG. 2 may be employed, for example, on a platform such as, for example, a network device, server, proxy, or the like. Alternatively, embodiments may be employed on a combination of devices. Accordingly, some embodiments of the present invention may be embodied wholly at a single device or by devices in a client/server relationship. Furthermore, it should be noted that the devices or elements described below may not be mandatory and thus some may be omitted in certain embodiments.

Referring now to FIG. 2, an apparatus for enabling safe handling of malware is provided. The apparatus may be an embodiment of the dismemberment engine 60 or a device hosting the dismemberment engine 60. As such, configuration of the apparatus as described herein may transform the apparatus into the dismemberment engine 60. In an example embodiment, the apparatus may include or otherwise be in communication with processing circuitry 150 that is configured to perform data processing, application execution and other processing and management services according to an example embodiment of the present invention. In one embodiment, the processing circuitry 150 may include a storage device 154 and a processor 152 that may be in communication with or otherwise control a local or remote user interface 160 and a device interface 162. As such, the processing circuitry 150 may be embodied as a circuit chip (e.g., an integrated circuit chip) configured (e.g., with hardware, software or a combination of hardware and software) to perform operations described herein. However, in some embodiments, the processing circuitry 150 may be embodied as a portion of a server, computer, laptop, workstation or even one of various mobile computing devices. In situations where the processing circuitry 150 is embodied as a server or at a remotely located computing device, the user interface 160 may be disposed at another device (e.g., the access interface 90) that may be in communication with the processing circuitry 150 via the device interface 162 and/or a network.

The user interface 160 may be in communication with the processing circuitry 150 to receive an indication of a user input at the user interface 160 and/or to provide an audible, visual, mechanical or other output to the user. As such, the user interface 160 may include, for example, a keyboard, a mouse, a joystick, a display, a touch screen, a microphone, a speaker, a cell phone, or other input/output mechanisms. In embodiments where the apparatus is embodied at a server or other network entity, the user interface 160 may be limited or even eliminated in some cases. Alternatively, as indicated above, the user interface 160 may be remotely located.

The device interface 162 may include one or more interface mechanisms for enabling communication with other devices and/or networks. In some cases, the device interface 162 may be any means such as a device or circuitry embodied in either hardware, software, or a combination of hardware and software that is configured to receive and/or transmit data from/to a network and/or any other device or module in communication with the processing circuitry 150. In this regard, the device interface 162 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 162 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 154 may include one or more non-transitory storage or memory devices such as, for example, volatile and/or non-volatile memory that may be either fixed or removable. The storage device 154 may be configured to store information, data, applications, instructions or the like for enabling the apparatus to carry out various functions in accordance with example embodiments of the present invention. For example, the storage device 154 could be configured to buffer input data for processing by the processor 152. Additionally or alternatively, the storage device 154 could be configured to store instructions for execution by the processor 152. As yet another alternative, the storage device 154 may include one of a plurality of databases that may store a variety of files, policies, instructions, contents or data sets. Among the contents of the storage device 154, applications may be stored for execution by the processor 152 in order to carry out the functionality associated with each respective application. The applications may, for example, instruct the processor 152 to divide executable objects (e.g., malware) into segments and encrypt the segments via a division module 180 and a segment encryption module 182.

The processor 152 may be embodied in a number of different ways. For example, the processor 152 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 152 may be configured to execute instructions stored in the storage device 154 or otherwise accessible to the processor 152. As such, whether configured by hardware or software methods, or by a combination thereof, the processor 152 may represent an entity (e.g., physically embodied in circuitry) capable of performing operations according to embodiments of the present invention while configured accordingly. Thus, for example, when the processor 152 is embodied as an ASIC, FPGA or the like, the processor 152 may be specifically configured hardware for conducting the operations described herein. Alternatively, as another example, when the processor 152 is embodied as an executor of software instructions, the instructions may specifically configure the processor 152 to perform the operations described herein.

In an example embodiment, the processor 152 (or the processing circuitry 150) may be embodied as, include or otherwise control the division module 180 and the segment encryption module 182, which may each be any means such as a device or circuitry operating in accordance with software or otherwise embodied in hardware or a combination of hardware and software (e.g., processor 152 operating under software control, the processor 152 embodied as an ASIC or FPGA specifically configured to perform the operations described herein, or a combination thereof) thereby configuring the device or circuitry to perform the corresponding functions of the division module 180 and the segment encryption module 182, respectively, as described herein.

The division module 180 manager may include tools to facilitate segmentation of executable objects according to the policy provided by the security policy engine 80. Thus, the division module 180 may be configured to take each executable object apart in chunks and remove the execution capability from each part by removing portions of the header that are needed to launch execution. The chunks may be of predetermined chunk sizes or random chunk sizes in various alternatives. In some cases, the header may be inspected to determine which parts are identified in the header, and division may be accomplished according to the parts identified in the header.

The segment encryption module 182 may be configured to encrypt each segment generated by the division module 180 according to the polity provided by the security policy engine 80. The segment encryption module 182 may also be configured to take the encrypted segment set generated and reassemble the segments into a list or collection of the corresponding separate segments or pieces. In some cases, the segment encryption module 182 may further add a header that documents the corresponding executable object and optionally also includes decryption information that can be used to decrypt the encrypted segment set. However, in other cases, the decryption information may only be supplied in response to a user request. Moreover, in some cases, access credentials of the user may further be required to be submitted and authenticated before the decryption information will be supplied. Thus, controls can be prescribed for enabling decryption and possible reconstitution of the malware.

Each of the dismemberment engine 60, the division module 180 and the segment encryption module 182 may be any means such as a device or circuitry operating in accordance with software or otherwise embodied in hardware or a combination of hardware and software (e.g., processor 152 operating under software control, the processor 152 embodied as an ASIC or FPGA specifically configured to perform the operations described herein, or a combination thereof) thereby configuring the device or circuitry to perform the corresponding functions of the dismemberment engine 60, the division module 180 and the segment encryption module 182, respectively, as described herein.

Figure 3:
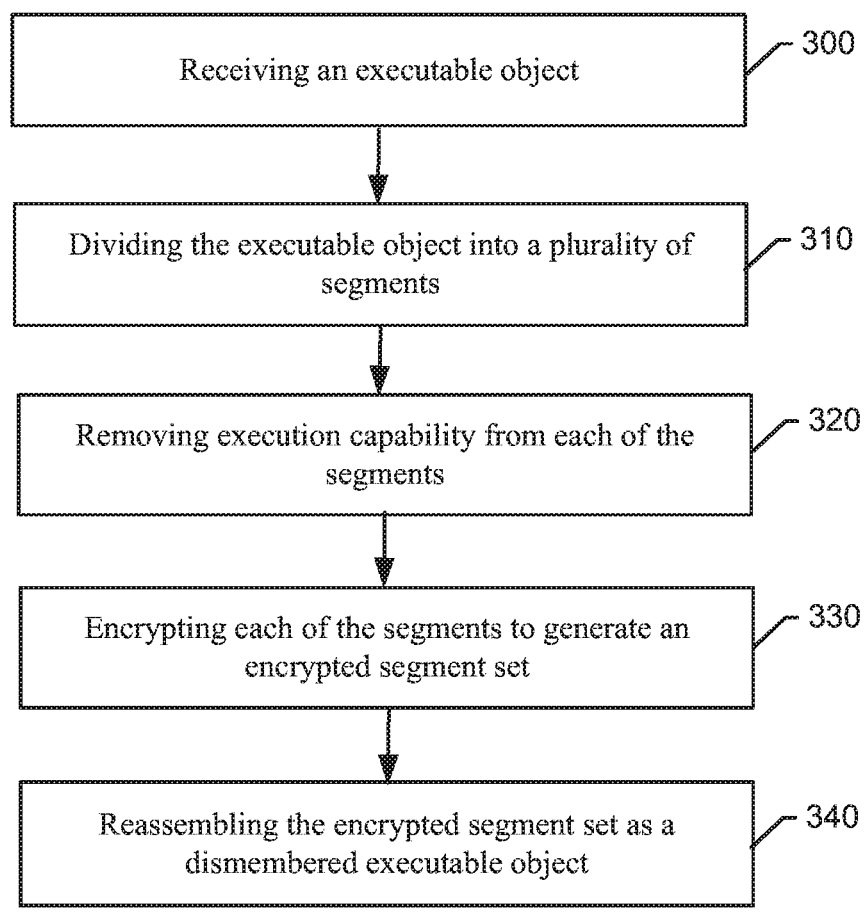
FIG. 3 illustrates a method of enabling safe handling of malware according to an example embodiment.

From a technical perspective, the dismemberment engine described above may be used to support some or all of the operations described above. As such, the platform described in FIGS. 1 and 2 may be used to facilitate the implementation of several computer program and/or network communication based interactions. As an example, FIG. 3 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a terminal, server or other computing platform and executed by a processor in the corresponding device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method for rendering malware files safe for handling according to one embodiment of the invention, as shown in FIG. 3, may include receiving an executable object at operation 300, and dividing the executable object into a plurality of segments or pieces at operation 310. The method may further include removing execution capability from each of the segments at operation 320 and encrypting each of the segments to generate an encrypted segment set at operation 330. The method may further include reassembling the encrypted segment set as a dismembered executable object at operation 340. The execution of the method may form the basis for controlling access to the malware, by only allowing transport through the system 10 to benign areas when the malware has been processed and is therefore a dismembered executable object. Status as a "defanged" piece of malware may therefore act as a passport, permitting movement through the system 10. Example embodiments may also provide controls for reconstituting the malware (e.g., for analysis) based on the requirement that such malware much be decrypted prior to enabling such reconstitution.

In an example embodiment, an apparatus for performing the method of FIG. 3 above may comprise a processor (e.g., the processor 52) or processing circuitry configured to perform some or each of the operations (300-340) described above. The processor may, for example, be configured to perform the operations (300-340) by performing hardware implemented logical functions, executing stored instructions, or executing algorithms for performing each of the operations. In some embodiments, the processor or processing circuitry may be further configured for additional operations or optional modifications to operations 300 to 340. In this regard, for example, the processing circuitry may be further configured to generate information indicative of the executable object for inclusion in the dismembered executable object. In an example embodiment, the processing circuitry may be further configured to provide the information indicative of the executable object in a header of the dismembered executable object. In some examples, the processing circuitry may be further configured to provide information for decrypting the encrypted segment set in the header or separately. In an example embodiment, the processing circuitry may be further configured to generate information (e.g., a decryption key) for decrypting the encrypted segment set and provide the information to a user responsive to authentication of an access permission level of the user. In some examples, the processing circuitry may be further configured to generate information for decrypting the encrypted segment set and provide the information to a user responsive to a request by the user. In some cases, the executable object digital file may be a malware file. In an example embodiment, the dismembered executable object may be automatically generated by the defang engine responsive to receipt of the executable object digital file.

Accordingly, example embodiments may be provided to increase the security of networks by making it easier, even automatic, to prevent malware from being unwittingly allowed to detonate within the networks. Safe handling is not only an option, but can be an automatic and normal operating condition.

Example embodiments may therefore enable efficient storage and handling of malware so that analysis can be conducted without expensive isolation methods and difficult to maintain procedures.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus for analyzing malware, the apparatus comprising processing circuitry configured to:
   identify malware among files of a network;
   enable files not containing malware to proceed to benign storage;
   provide a malware file identified to a malware repository;
   receive an executable malware object, the executable malware object including a malware header;
   divide the executable malware object into a plurality of malware segments, wherein the plurality of malware segments are divided based on a predetermined size or a random size;
   remove execution capability from the plurality of malware segments by:
      removing, from the plurality of malware segments, portions of the malware header that are needed to launch execution of the executable malware object, and
      encrypting the plurality of malware segments of the executable malware object to generate an encrypted malware segment set upon the removing of the portions of the malware header;
   reassemble the encrypted malware segment set as a dismembered executable malware object, wherein the dismembered executable malware object is unable to execute and the malware file is converted to the dismembered executable malware object before a received request for the malware file is fulfilled; and
   decrypt one or more malware segments of the encrypted malware segment set for malware analysis of the executable malware object, wherein the decrypted one or more malware segments are unable to execute.

2. The apparatus of claim 1, wherein the processing circuitry is further configured to generate information indicative of the executable malware object for inclusion in the dismembered executable malware object.

3. The apparatus of claim 2, wherein the processing circuitry is further configured to provide the information indicative of the executable malware object in a header of the dismembered executable malware object.

4. The apparatus of claim 3, wherein the processing circuitry is further configured to provide information for decrypting the encrypted malware segment set in the header of the dismembered executable malware object.

5. The apparatus of claim 1, wherein the processing circuitry is further configured to generate information for decrypting the encrypted malware segment set and provide the decryption information to a user responsive to authentication of an access permission level of the user.

6. The apparatus of claim 1, wherein the processing circuitry is further configured to generate information for decrypting the encrypted malware segment set and provide the decryption information to a user responsive to a request by the user.

7. The apparatus of claim 1, wherein the dismembered executable malware object is automatically generated by the apparatus responsive to receipt of the executable malware object.

8. A system for analyzing malware, the system comprising:
   a security agent configured to:
      identify malware among files of a network,
      enable files not containing malware to proceed to benign storage, and
      provide a malware file identified to a malware repository;
   a dismemberment engine comprising processing circuitry configured to:
      receive an executable malware object, the executable malware object including a malware header;
      divide the executable malware object into a plurality of malware segments, wherein the plurality of malware segments are divided based on a predetermined size or a random size;

remove execution capability from the plurality of malware segments by:
  removing, from the plurality of malware segments, portions of the malware header that are needed to launch execution of the executable malware object, and
  encrypting the plurality of malware segments of the executable malware object to generate an encrypted malware segment set upon the removing of the portions of the malware header; and
reassemble the encrypted malware segment set as a dismembered executable malware object, wherein the dismembered executable malware object is unable to execute;
a policy engine configured to instruct the dismemberment engine regarding dividing the executable malware object; and
an access interface operably coupled to the policy engine to receive a request for the malware file and communicate with the policy engine to ensure that the malware file is converted to the dismembered executable malware object before the request is fulfilled; and
a malware analysis tool configured to decrypt one or more malware segments of the encrypted malware segment set for malware analysis of the executable malware object, wherein the decrypted one or more malware segments are unable to execute.

9. The system of claim 8, wherein the processing circuitry is further configured to generate information indicative of the executable malware object for inclusion in the dismembered executable malware object.

10. The system of claim 9, wherein the processing circuitry is further configured to provide the information indicative of the executable malware object in a header of the dismembered executable malware object.

11. The system of claim 10, wherein the processing circuitry is further configured to provide information for decrypting the encrypted malware segment set in the header of the dismembered executable malware object.

12. The system of claim 8, wherein the processing circuitry is further configured to generate information for decrypting the encrypted malware segment set and provide the decryption information to a user responsive to authentication of an access permission level of the user.

13. The system of claim 8, wherein the processing circuitry is further configured to generate information for decrypting the encrypted malware segment set and provide the decryption information to a user responsive to a request by the user.

14. The system of claim 8, wherein the dismembered executable malware object is automatically generated by the dismemberment engine.

15. The system of claim 8, wherein the policy engine is configured to determine when a new executable object is received and employ a policy stored at the policy engine to employ a selected division and encryption strategy based on class information associated with the new executable object.

16. The system of claim 8, wherein the access interface operates responsive to a request from a malware analysis tool.

17. A method for analyzing malware, the method comprising:
  identifying malware among files of a network;
  enabling files not containing malware to proceed to benign storage;
  providing a malware file identified to a malware repository;
  receiving an executable malware object, the executable malware object including a malware header;
  dividing the executable malware object into a plurality of malware segments, wherein the plurality of malware segments are divided based on a predetermined size or a random size;
  removing execution capability from the plurality of malware segments by:
    removing, from the plurality of malware segments, portions of the malware header that are needed to launch execution of the executable malware object, and
    encrypting the plurality of malware segments of the executable malware object to generate an encrypted malware segment set upon the removing of the portions of the malware header;
  reassembling the encrypted malware segment set as a dismembered executable malware object, wherein the dismembered executable malware object is unable to execute and the malware file is converted to the dismembered executable malware object before a received request for the malware file is fulfilled; and
  decrypting one or more malware segments of the encrypted malware segment set for malware analysis of the executable malware object, wherein the decrypted one or more malware segments are unable to execute.

18. The method of claim 17, further comprising generating information indicative of the executable malware object for inclusion in the dismembered executable malware object.

19. The method of claim 18, further comprising providing the information indicative of the executable malware object and information for decrypting the encrypted malware segment set in a header of the dismembered executable malware object.

20. The method of claim 17, further comprising generating information for decrypting the encrypted malware segment set and providing the decryption information to a user responsive to authentication of an access permission level of the user.

21. The method of claim 17, further comprising generating information for decrypting the encrypted malware segment set and providing the decryption information to a user responsive to a request by the user.

* * * * *